United States Patent
Morales (10) Patent No.: US 11,586,399 B1
(45) Date of Patent: Feb. 21, 2023

(54) METHODS FOR ADJUSTING INK USE IN A PRINTING SYSTEM FOR COST MONITORING AND CONTROL

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/399,317

(22) Filed: Aug. 11, 2021

(51) Int. Cl.
*G06F 3/12* (2006.01)
*G06K 15/10* (2006.01)

(52) U.S. Cl.
CPC .......... *G06F 3/1219* (2013.01); *G06F 3/1239* (2013.01); *G06K 15/102* (2013.01); *G06K 2215/0094* (2013.01)

(58) Field of Classification Search
CPC ................ G06F 3/1219; G06F 3/1239; G06K 15/102; G06K 2215/0094
See application file for complete search history.

(56) References Cited

U.S. PATENT DOCUMENTS

| | | | |
|---|---|---|---|
| 8,446,602 B2 | 5/2013 | Harris et al. | |
| 2004/0201634 A1* | 10/2004 | Collier | G07F 17/0014 347/7 |
| 2011/0026948 A1* | 2/2011 | Nagasu | G03G 15/553 399/35 |
| 2012/0206515 A1* | 8/2012 | Walker | B41J 2/175 347/105 |
| 2013/0101328 A1* | 4/2013 | Morovic | H04N 1/00005 400/76 |

* cited by examiner

*Primary Examiner* — Moustapha Diaby
(74) *Attorney, Agent, or Firm* — Millen, White, Zelano & Branigan, P.C.; William Nixon (57) ABSTRACT

A printing system includes a printing device, a color management server, and a client device. An estimated ink use is determined for a print job within printing system. After printing operations, a baseline average ink use is determined for a set of printed pages of the print job. If the baseline average ink use varies from the estimated ink use, then a corrective action is taken to adjust ink use to be closer to the estimated ink use. The corrective action is a global corrective action for the entire document of the print job or a targeted action that adjusts only specified features or pages of the document.

10 Claims, 8 Drawing Sheets

METHODS FOR ADJUSTING INK USE IN A PRINTING SYSTEM FOR COST MONITORING AND CONTROL

FIELD OF THE INVENTION

The present invention relates to a printing system and associated methods to actively monitor print jobs during production and adjust ink use in real-time during printing operations.

DESCRIPTION OF THE RELATED ART

Although ink use estimation may be fairly accurate, there is potential for an estimate to be inaccurate due the distribution of content within the production print run versus the sample used to estimate the ink usage. For example, a customer may print a document that is composed of several different types of pages. Using this example, a sample finance package may include the following components: a cover letter or sales pitch that is high coverage with large images and color, one or more information packages for financial products showing performance information, such as charts and graphs, with medium coverage, and one or more forms with only text with light coverage.

The overall document based on the sample, therefore, may specify that the high coverage pages are 20% of all pages, the medium coverages pages are 60%, and the light coverage pages are 20%. An attendant ink cost estimation should reflect the above distribution of documents. If, however, the actual distribution of coverage within the overall document does not align with the distribution of coverage used for the sample, then the cost estimate will be inaccurate. Thus, the print shop may lose money on the print job due to the inaccurate estimate that is below the actual cost. Given that some of these print jobs are millions of impressions every month along with contracts for a couple years or more, an inaccurate ink use estimate could be quite problematic.

SUMMARY OF THE INVENTION

A method for adjusting ink use during a print job is disclosed. The method includes providing an estimated ink use for the print job. The estimated ink use is based on an average per page ink usage for the print job. The method also includes printing a first set of pages for the print job. The method also includes establishing a baseline average ink use for the first set of pages. The method also includes comparing the baseline average ink use to the estimated ink use. The method also includes implementing a corrective action to reduce ink usage for a second set of pages to be printed for the print job based on the comparison or taking no corrective action for the second set of pages to be printed for the print job based on the comparison.

A method for correcting ink use during printing operations is disclosed. The method includes printing a first set of pages for a print job at a printing device. The method also includes comparing a baseline average ink use for the first set of pages to an estimated ink use for the print job. The method also includes determining that the baseline average ink use is not within an acceptable range of the estimated ink use. The method also includes analyzing a first ink usage over a subset of the first set of pages for the print job. The method also includes, based on the analysis of the first ink usage, implementing a corrective action to reduce ink usage for a second set of pages to be printed for the print job at the printing device. The method also includes printing a subset of the second set of pages at the printing device. The method also includes monitoring a second ink usage over the subset of the second set of pages to determine if the corrective action reduces the baseline average ink use for the print job.

A method for implementing targeted ink use during printing operations is disclosed. The method includes generating a print job having a plurality of pages. Each page has metadata. The method also includes specifying a quality policy for each page within the metadata. The quality policy defines at least one ink usage action for the page. The method also includes applying the at least one ink usage action for the page. The method also includes adjusting ink use in printing the page based on the at least one ink usage action. An estimated ink use for the print job is implemented based on the ink use of the plurality of pages for the print job.

A method for implementing print job instructions during printing operation is disclosed. The method includes generating a print job having a plurality of pages. The print job includes print job instructions. The method also includes specifying a quality policy for each page according to the print job instructions. The quality policy defines at least one ink usage action for the page. The method also includes applying the at least one ink usage action for the page. The method also includes adjusting ink use in printing the page based on the at least one ink usage action. An estimated ink use for the print job is implemented based on the ink use of the plurality of pages for the print job.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments enable a printing system that actively monitors job costs during production printing operations. The printing system may adjust ink use in a dynamic manner in order to ensure that production printing costs remain within estimated costs. Ink use estimation allows print shops to accurately determine job costs so they can quote large but low margin jobs aggressively. If the ink use estimation is too conservative, then the print shop runs the risk of losing work due to pricing that is not competitive. If, however, the price is too low, then the print shop risks either realizing insufficient profit or, in a worst case scenario, losing money every time that they print a large job that may be contracted for an extended period of time, such as several years.

The disclosed embodiments are a backstop for the second scenario. By adjusting ink use in a dynamic manner during production printing, the printing system may ensure that the print shop does not actually lose money for a print job.

A customer registers a print job with the printing system and performs ink use estimation using a sample job. The estimation calculates the average per page ink usage for the sample job. When a production job related to the customer or sample job is received, it is associated with the previous ink use estimation. While the print job is printing, the printing system will determine ink usage for pages as they print.

The printing system collects ink usage information for a small number of pages in order to establish a job baseline, or a baseline average ink use. After the baseline average ink use is established, then the printing system will compare the production average ink use against the estimated average ink use. If the production ink use is lower than the estimated ink use, then production continues and the printing system continues to monitor ink use. If the production ink use is higher than the estimated ink use, then the printing system will monitor how ink use is trending over a specified number of pages.

If the ink use is trending up or remaining steady, then the printing system may take corrective action to reduce ink usage. Corrective action may include global corrective actions, more targeted actions, or actions based on customer preference. Once corrective action is taken, the printing system will continue to monitor the ink use per page. It also may determine whether the ink use is in a trajectory to fall within acceptable levels. If the ink use is still not on track to be within acceptable levels, then the printing system may adjust the ink use actions using more aggressive settings.

The printing system will continue to monitor ink use and to adjust up or down as needed to ensure that the total ink costs remain within the estimated ink costs. This process may remain in place until the print job is completed. After the print job is complete, the printing system may optionally feed ink use data back to the printing system that tracks the ink use. Specifically, the printing system would return unadjusted ink use and report the differences between estimated and actual use to the customer. The customer may use this information to go back to the print shop with a request to adjust pricing based on the production ink use calculations.

Figure 1A:
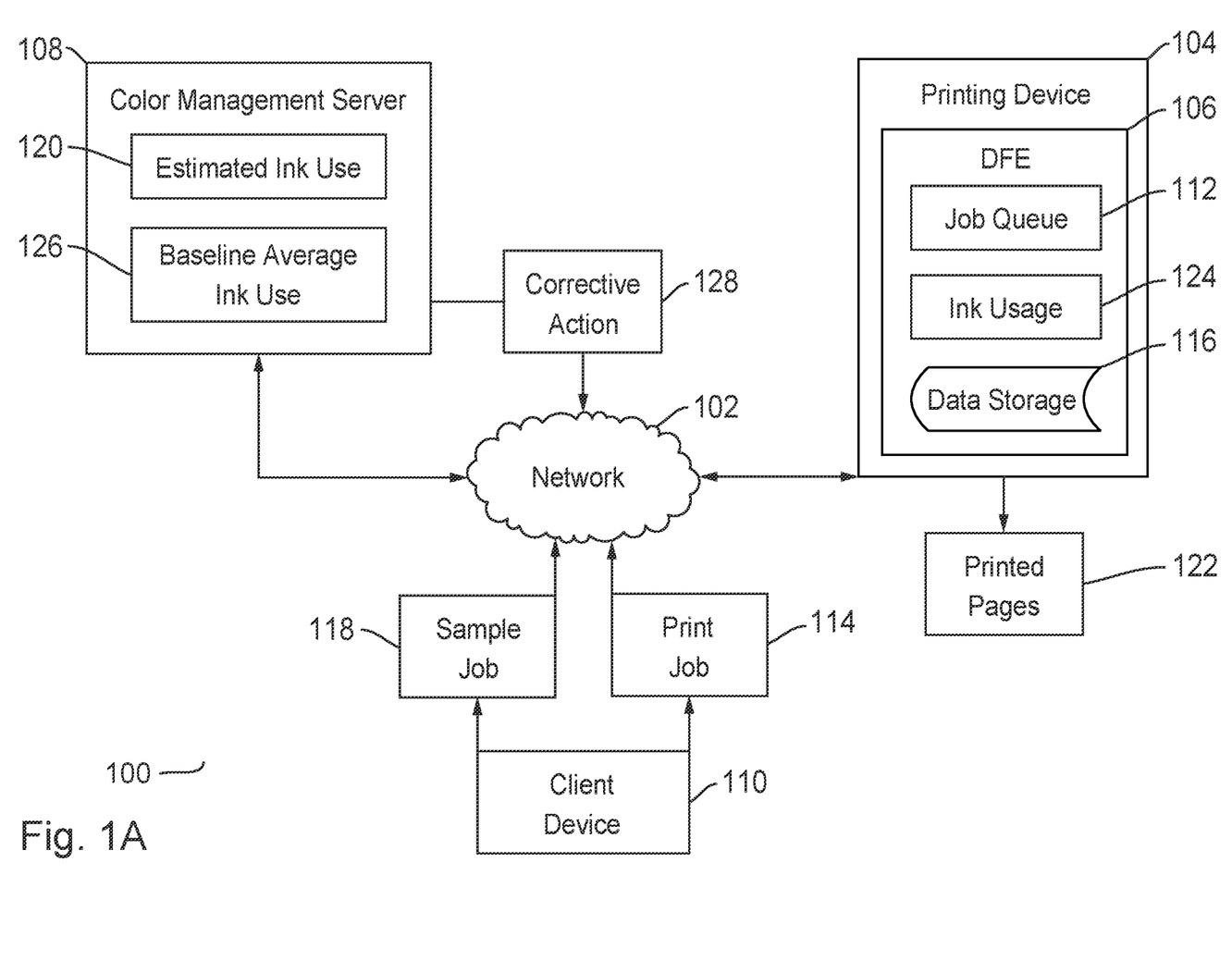
FIG. 1A illustrates a block diagram of a printing system having a printing device according to the disclosed embodiments.

FIG. 1A depicts a printing system 100 having a printing device 104 connected to a client device 110 and a color management server 108 according to the disclosed embodiments. Printing system 100 includes printing device 104 that receives print jobs from client device 110. Client device 110 may be any device capable of executing applications and programs to generate documents and files, such as, for example, a computer, a laptop computer, mobile device or tablet, smart phone, kiosk, and the like. Client device 110 may send print jobs to printing device 104 over one or more networks 102 implemented within printing system 100. Additional client devices may be connected to printing device 104. Further, additional printing devices 104 may be implemented within printing system 100. For example, a plurality of printing devices 104 may be used for large scale printing operations.

Printing system 100 includes color management server 108. Color management server 108 may store data and perform functions according to the disclosed embodiments. It may estimate ink use for a print job based on a sample job 118 from client device 110. Alternatively, sample job 118 may be received at printing device 104 then forwarded to color management server 108. Color management server 108 also may monitor and adjust ink use at printing device 104 while print job 114 is printing. Print job 114 may be associated with sample job 118. In some embodiments, color management server 108 may be a separate component within printing system 100. In other embodiments, color management server 108 may be implemented within printing device 104.

Network 102 may be used by system 100 to exchange data between devices within system 100. Devices 104, 108, and 110 are configured to communicate with network 102 over a physical communications interface or layer such as air interfaces and/or a direct wired connection. Air interfaces may be a given cellular communications protocol (e.g., GSM, CDMA, W-CDMA, EVDO, eHRPD, EDGE, 4G LTE, 5G LTE, 5G NR/New Radio, etc.) or a wireless IP protocol (e.g., IEEE 802.11 family) Alternatively, network 102 may be a local area network, wide area network, an ad-hoc network, and the like. Network 102 allows printing device 104, color management server 108, and client device 110 to exchange data using the appropriate protocol.

Printing device 104 is disclosed in greater detail below. It includes digital front end (DFE) 106, or a printing device controller, that is the workflow touchpoint which accepts a print job, or print file, commonly a PDF or PostScript file. DFE 106 converts the file of the print job into a format that print engine 260, disclosed below, can use to lay down the content of the document corresponding to the print job on a media. DFE 106 may include a raster image processor (RIP) as well as other components. DFE 106 may support or host color management server 108. Features within DFE 106 include job queue 112 and data storage 116.

Figure 1B:
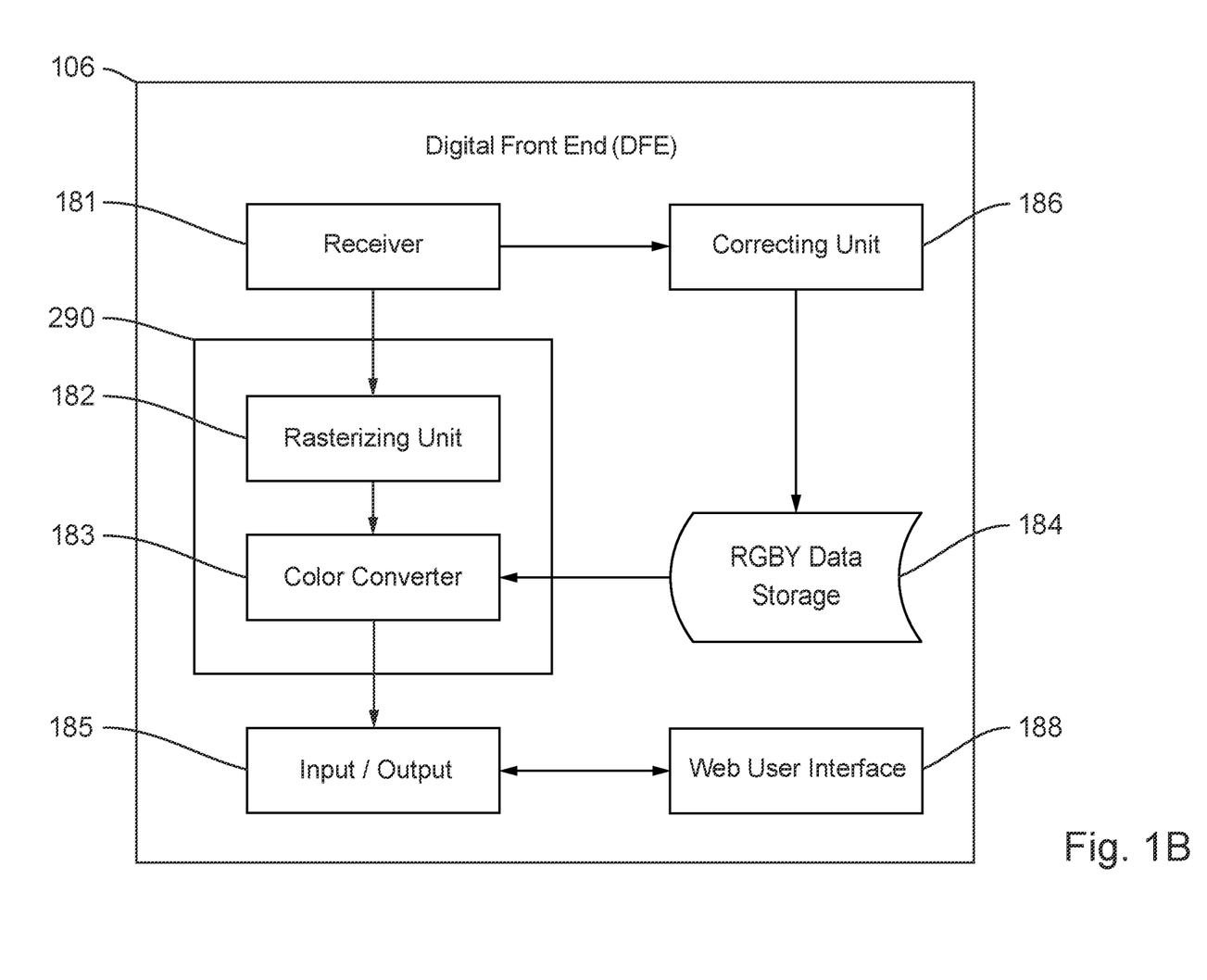
FIG. 1B illustrates a block diagram of a digital front end of the printing device according to the disclosed embodiments.

FIG. 1B depicts a block diagram of DFE 106 according to the disclosed embodiments. DFE 106 includes a receiver 181, an RIP firmware 290 including rasterizing unit 182 and a color converter 183, an RGBY data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also includes job queue 112 and data storage 116.

The disclosed embodiments will refer to client device 110 for illustrative purposes. Receiver 181 receives a print job generated by client device 110 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs) stored in RGBY data storage 184. A TRC refers to data indicating the relationship between a colored gradation value for rendering data and print color, or print density, on a given print medium.

When print color provided by printing device 104 alters over time, the TRCs stored in RGBY data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in RGBY data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in RGBY data storage 184 is replaced with the generated TRC. Correcting unit 186 may correct the TRC. Correcting unit 186 may rewrite a part of the TRC stored in RGBY data storage 184 to thereby correct the TRC.

RIP firmware 290 includes rasterizing unit 182 and color converter 183. The rendering data generated by RIP firmware 290 is transmitted within printing device 104 via input/output connector 185. The print condition information and the print medium type, as well as the rendering data, may be transmitted to engine 260 of printing device 104.

DFE 106 also includes web user interface 188 that may communicate with client device 110 using, for example, input/output connector 185. Web user interface 188, or web application, allows a user of client device 110 to interact with content or software running on DFE 106 through a web browser at the client device. The content, or web page, is downloaded from DFE 106 and the user can interact with this content in the web browser, which acts as a client. The distributed nature allows the content to be stored on DFE 106, while the ubiquitous nature of the web browser permits a convenient access to the content at the DFE.

Referring back to FIG. 1A, DFE 106 also includes job queue 112. Job queue 112 includes print jobs received for processing as disclosed above. Job queue 112 may place the print jobs in an order for printing on printing device 104. DFE 106 also includes data storage 116 that stores various files. Color management server 108 may be implemented at DFE 106 using data storage 116.

When client device 110 defines a new print job file 114 to submit to DFE 106, it may define the print description language (PDL) files that are part of the print job and job processing instructions, such as hold, print, quantity, media, and the like that will be used to produce the print job.

Printing system 100 actively monitors job costs and ink use during production printing operations. It also may adjust ink use for print job 114 dynamically in order to ensure that production costs remain within estimated costs. Before submitting print job 114, client device 110 may provide sample job 118 to color management server 108. Sample job 118 may be similar to the production print job to be printed on printing device 104. Color management server 108 may perform an ink use estimation using sample job 118. Estimated ink use 120 is determined and may be provided to the other devices within printing system 100. Estimated ink use 120 is the average per page ink usage based on sample job 118.

Client device 110 submits print job 114 to printing device 104 or to color management server 108, which then provides it to the printing device. Print job 114 is associated with estimated ink use 120. Print job 114 may include data that identifies it as being related to sample job 118, used to generate estimated ink use 120. While printing device 104 prints printed pages 122 of print job 114, the disclosed embodiments may determine ink usage 124 for printed pages 122. DFE 106 may determine ink usage 124. Ink usage 124 may be provided to color management server 108.

Color management server 108 may collect ink usage 124 for a small number of printed pages 122 of print job 114 in order to establish a baseline average ink use 126. For example, color management server 108 may collect ink use information on the first 1000 pages of print job 114 in order to establish baseline average ink use 126. This value is determined in order to ensure that ink use outliers do not trigger a response that may not be needed. In other words, the first set of printed pages 122 should be large enough to provide meaningful statistical feedback on ink usage 124.

After baseline average ink use 126 is determined, color management server 108 will compare the production average ink use against the estimated average ink use. Thus, baseline average ink use 126 of the first set of printed pages 122 is compared to estimated ink use 120 determined earlier. Depending on the outcome of the comparison, a corrective action 128 may be taken to adjust ink usage for the remainder of print job 114. Corrective action 128 is disclosed in greater detail below. Corrective action 128 may instruct printing device 104 to reduce ink usage for further printing operations. In other embodiments, the comparison may indicate that no action be taken and printing operations continue on printing device 114 without adjustment.

After print job 114 is printed as printed pages 122, the disclosed embodiments may provide ink usage 124 for the entire print job back to color management server 108 for tracking purposes. DFE 106 may return unadjusted ink use and report any difference between the estimated and the actual ink use so that this information may be reported to the customer. Color management server 108 may use this data to provide more accurate ink use estimations for future print jobs.

Figure 2:
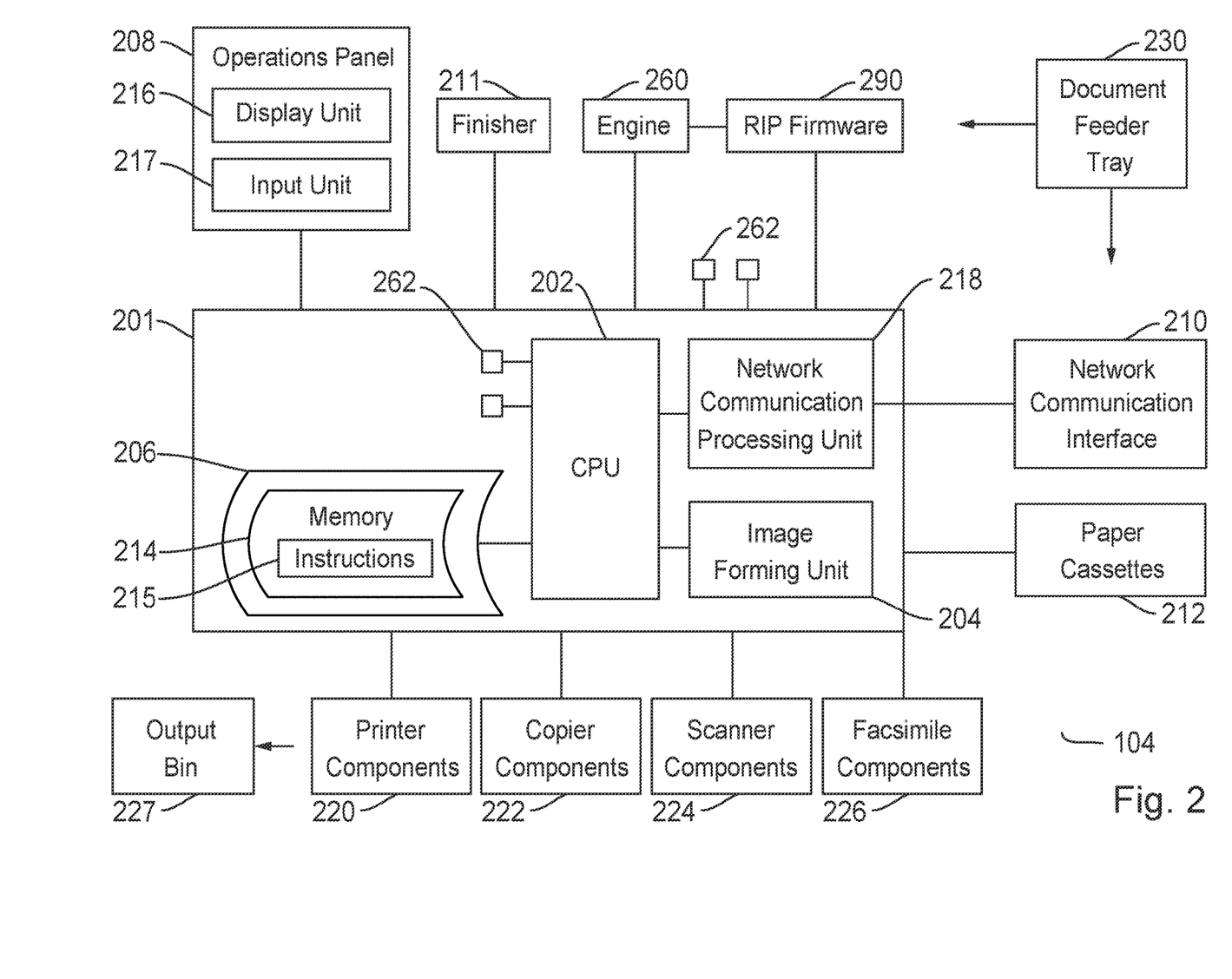
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from client device 110 and color management server 108, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFB 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. Sensors 262 also may detect the amount ink used for a printing operation. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Memory unit 206 also may store ink usage 124 for print jobs or sets of printed pages 122. Memory unit 206 may include data storage 116, disclosed above. Printing device 104 communicates with client device 110 and color management server 108 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 110.

Figure 3:
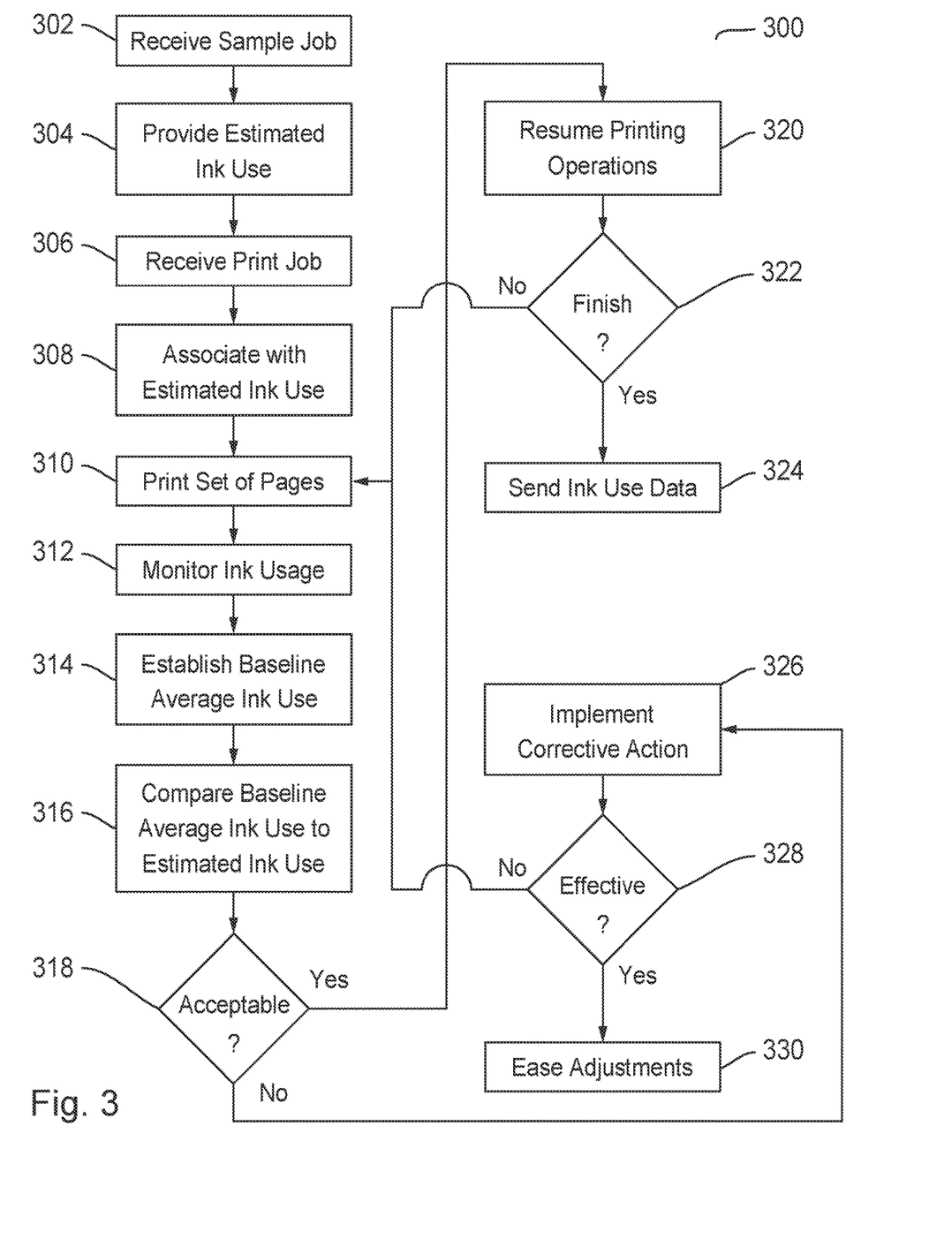
FIG. 3 illustrates a flowchart for monitoring ink use during printing operations according to the disclosed embodiments.

FIG. 3 depicts a flowchart 300 for monitoring ink use during printing operations according to the disclosed embodiments. Flowchart 300 may refer to FIGS. 1A-2 for illustrative purposes. Flowchart 300, however, is not limited by the features disclosed by FIGS. 1A-2.

Step 302 executes by receiving sample job 118 at color management server 108. As disclosed above, sample job 118 may be related to print job 114 that is to be sent to one or more printing devices 104 within printing system 100. A customer may want an estimate to print a large number of copies of a document, which will be print job 114. Sample job 118 may be a copy of that document, including graphics, text, pictures, and the like, which influence the amount of ink used.

Step 304 executes by providing estimated ink use 120 for print job 114. Color management server 108 may calculate this value using sample job 118. For example, color management server 108 may estimate the cost to print the job based on the amount of ink needed to print sample job 118 multiplied by the number of copies. The document may have 50 pages and print job 114 may call for 200 copies of the document, or 10,000 printed pages. Color management server 108 may calculate an estimated ink usage of X to print sample job 118. Thus, sample job 118 may have an average per page ink usage of X/50 pages, or Y. For a 10,000 page print job, the disclosed embodiments may multiply average per page ink usage Y by 10,000 for an overall estimated ink usage for print job 114. Thus, the average per page ink usage is used to determine estimated ink use 120.

Step 306 executes by receiving print job 114 to print at printing device 104. Print job 114 may be received at printing device 114 from client device 110, or from color management server 108. Another device may provide print job 114 as well. Step 308 executes by associating print job 114 with estimated ink use 120. Print job 114 may include metadata or other information to link it with sample job 118, which then identifies the estimated ink use determined above.

Step 310 executes by printing a set of printed pages 122 at printing device 104. For example, if print job 114 calls for printing 10,000 pages, then the set of printed pages 122 may be 1000 pages. Another parameter to determine the size of the set may be the number of copies of the document printed. Thus, the set of printed pages 122 may correspond to 20 copies of the document at 50 pages each. Step 312 executes by monitoring ink usage during the printing operations at printing device 104. Printing device 104 may use sensors 262 to collect ink use information for the printed set of pages.

Step 314 executes by establishing baseline average ink use 126 for the set of printed pages 122. This value may be determined by dividing the amount of ink usage 124 by the number of printed pages to calculate a per page ink use, or baseline average ink use per page. Step 316 executes by comparing these values to determine whether printing operations are running higher or lower than the estimated ink use for print job 114. Thus, baseline average ink use 126 is compared to estimated ink use 120. In some embodiments, the average per page ink usage for the printed pages is compared against the average per page ink usage estimated for print job 114.

Step 318 executes by determining whether the current ink usage for the set of printed pages 122 is acceptable based on the comparison of baseline average ink use 126 and estimated ink use 120. Thus, the disclosed embodiments compare the production average ink use against the estimated average ink use. In some embodiments, the baseline average ink use 126 is acceptable if it is substantially equal to or lower than estimated ink use 120. In other embodiments, baseline average ink use 126 is acceptable if it is within a tolerance range of estimated ink use 120, even if it is higher. For example, the print shop may determine that higher ink use would be acceptable as long as it is within 5% of estimated ink use 120. If baseline average ink use 126 is lower than estimated ink use 120, then no changes need to be made.

If step 318 is yes, then step 320 executes by resuming printing operations at printing device 104 to continue printing print job 114. No changes to ink use for print job 114 needs to be made. Step 322 executes by determining whether print job 114 is finished printing at printing device 104. If no, then flowchart 300 returns back to step 310 to continue monitoring ink use. Steps 310-318 may be repeated for another set of printed pages 122. Thus, monitoring of ink use, and the costs associated therewith, may continue until all of the print job is completed. If step 322 is yes, then step 324 executes by sending ink data to color management server 108, as disclosed above.

If step 318 is no, then baseline average ink use 126 is higher than estimated ink use 120, or at least above an acceptable amount for print job 114. Thus, step 326 executes by taking corrective action 128 to reduce ink use to make it more in line with estimated ink use 120. In other words, the disclosed embodiments will take action to bring the costs for completing the print job more in line with what was estimated. Types of corrective actions are disclosed in greater detail below by FIGS. 4-6B.

Figure 5:
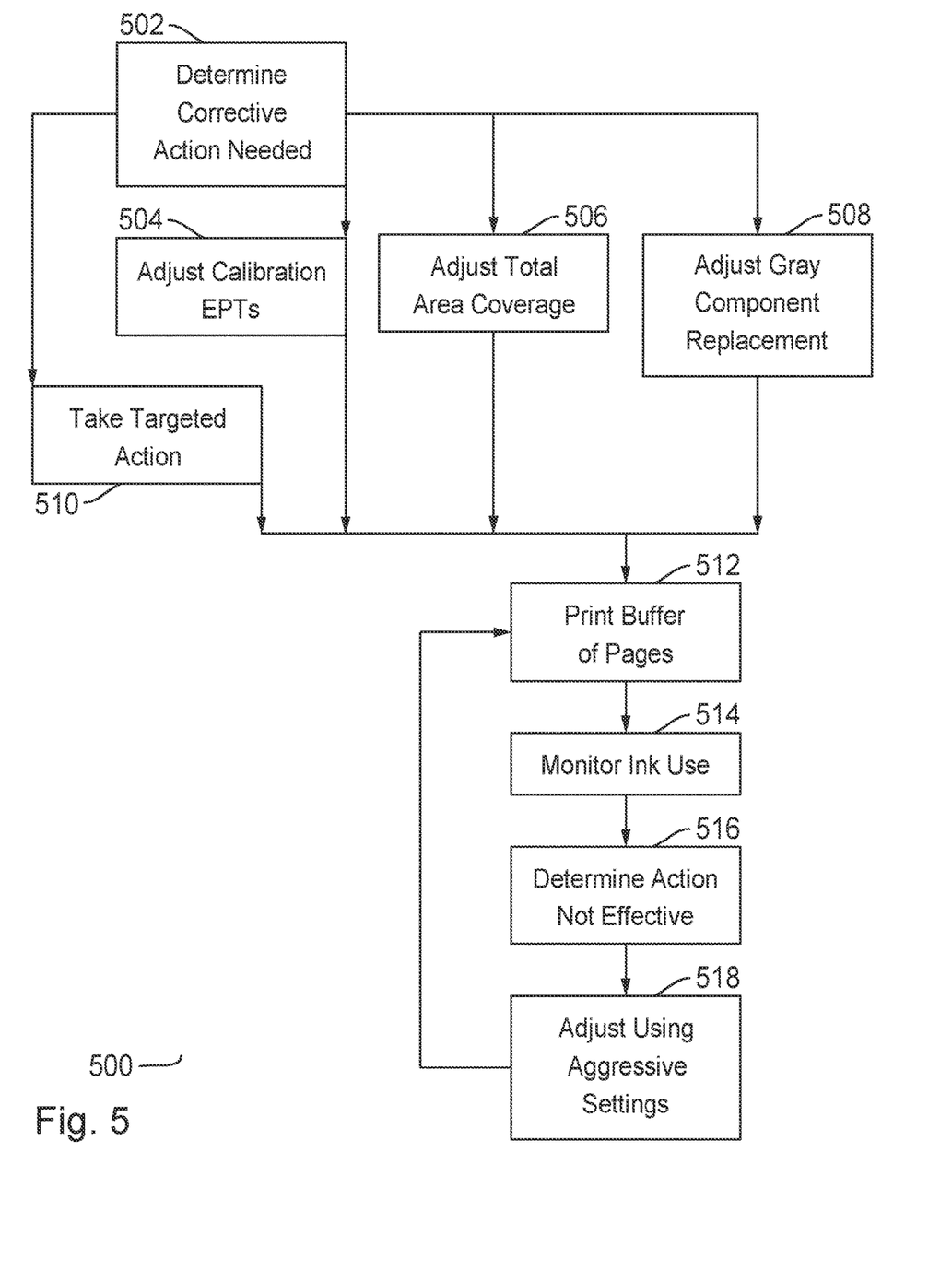
FIG. 5 illustrates a flowchart for taking a corrective action to reduce ink use for a print job according to the disclosed embodiments.

After implementing corrective action 128, step 328 executes by determining whether corrective action 128 is effective in reducing ink use and, therefore, costs for continuing with print job 114. This step may be disclosed in greater detail by steps 512-518 of flowchart 500 disclosed below. If step 328 is no, then flowchart 300 may return to step 310 to repeat the analysis process for another set of printed pages 122. It also may implement another corrective action or more aggressive settings, as disclosed below.

If step 328 is yes, then step 330 executes by easing off on adjustments made by corrective action 128. The original parameters for ink use may be returned to once ink use is back in the desired range. This step means that the quality of the remaining parts of print job 114 will not be sacrificed needlessly to reduce costs.

Figure 4:
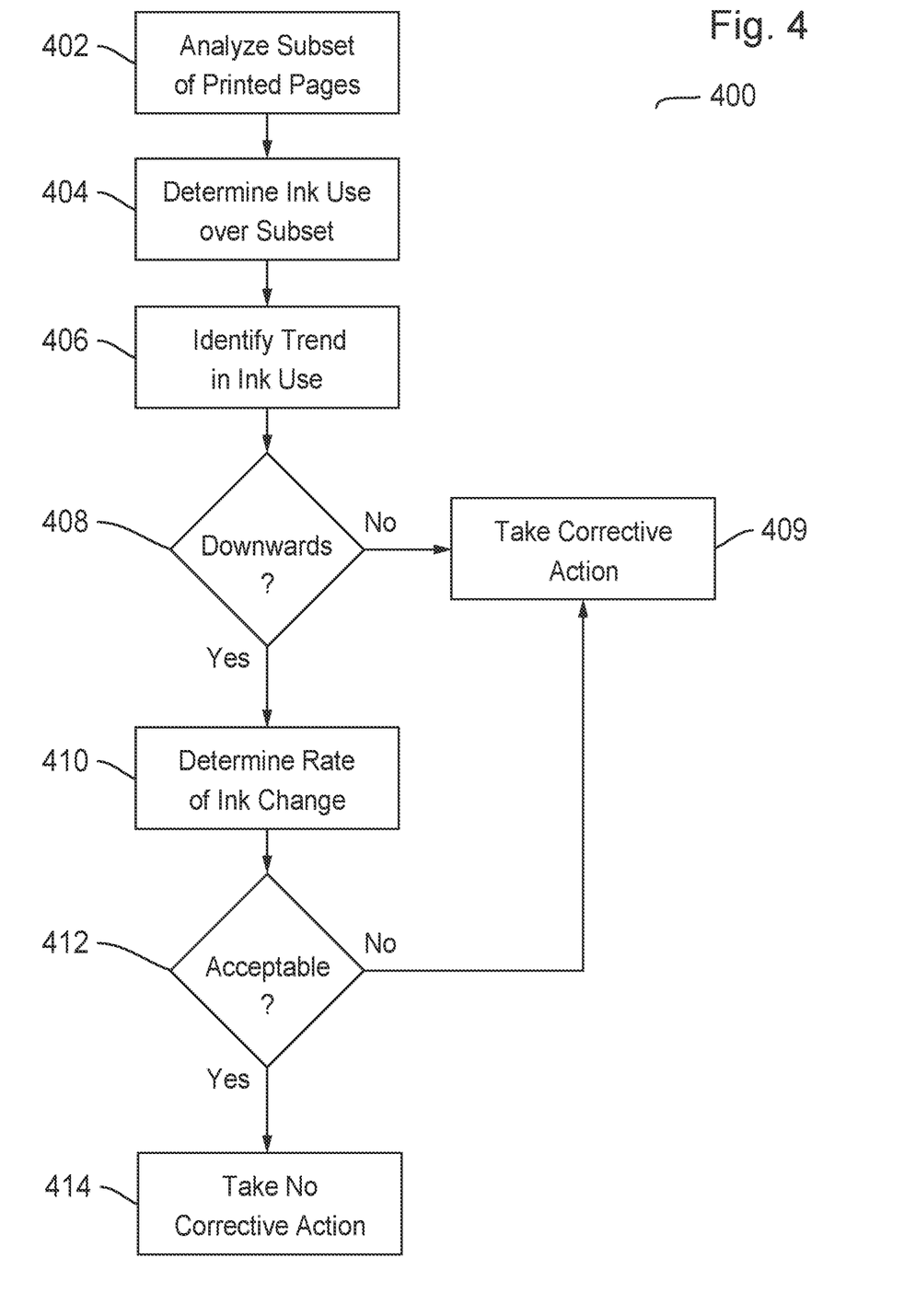
FIG. 4 illustrates a flowchart for monitoring ink use for a trend over a subset of the set of printed pages according to the disclosed embodiments.

FIG. 4 depicts a flowchart 400 for monitoring ink use for a trend over a subset of the set of printed pages 122 according to the disclosed embodiments. Flowchart 400 may refer to FIGS. 1A-3 for illustrative purposes. Flowchart 300, however, is not limited by the features disclosed by FIGS. 1A-3. If production ink use is higher than the estimated ink use then the disclosed embodiments may monitor how ink use is trending over a specified number of pages. For example, the print shop may specify that the ink use over the last 100 pages be used to determine whether correction is needed or not. If the ink use is trending downwards, then the disclosed embodiments may use the rate of ink use change to determine whether ink use is likely to go back down to an acceptable level within print job 114. In this instance, the disclosed embodiments would not take any corrective action.

Step 402 executes by analyzing a subset of the set of printed pages 122. For example, ink use over the last 100 pages of the 1000 pages of the set may be analyzed for trends in ink use to determine whether it makes sense to take corrective action. The size of the subset may vary as needed. Maybe the first few hundred pages of print job 114 caused a higher level of ink use than actually needed and printing device 104 is now using ink at the levels set forth for estimated ink use 120.

Step 404 executes by determining ink usage 124 over the subset of the set of printed pages 122. This determination is similar to steps 312 and 314 disclosed above. A baseline average ink use 126 may be established for the subset, which is different than the one determined for the larger set of printed pages 122. Step 406 executes by identifying a trend in the ink use for the subset of the set of printed pages 122. The trend may be that the average ink use is going down for the last 100 pages compared to the overall average ink use for the set of 1000 pages. Alternatively, the trend may be that no change is seen in the last 100 pages when compared to the set of 1000 pages or it may be that ink use is increasing over the subset.

Step 408 executes by determining whether the trend is downwards for the ink use over the subset of the set of printed pages 122. If no, then step 409 executes by taking corrective action 128, which is disclosed in greater detail below. The disclosed embodiments act as if the trend does not change the original determination made above that corrective action is needed to lower ink use for print job 114, which, in turn, reduces the cost of printing the documents.

If step 408 is yes, then step 410 executes by determining the rate of the ink change for the trend observed over the subset of the set of printed pages 122. This step determines whether ink use is likely to go back down to an acceptable level within print job 114. The disclosed embodiments may determine the downward trend will place ink use within the acceptable levels defined above with regard to step 318. Alternatively, an acceptable rate of change may be defined so that if the downward trend of ink use is substantially close the acceptable rate of change, then the trend is acceptable. Step 412 executes by determining whether the downward trend for the ink use is acceptable. If no, then flowchart 400 proceeds to step 409. If step 412 is yes, then step 414 executes by taking no corrective action regarding the ink use for print job. Flowchart 400 may then proceed to step 320 disclosed above.

FIG. 5 depicts a flowchart 500 for taking a corrective action to reduce ink use for print job 114 according to the disclosed embodiments. Flowchart 500 may refer to FIGS. 1A-4 for illustrative purposes. Flowchart 500, however, is not limited by the features disclosed by FIGS. 1A-4. If the ink use is trending up or remaining steady as disclosed above, then the disclosed embodiments may take corrective action 128 to reduce ink usage while printing print job 114. Printing system 100, color management server 108, or printing device 104 may take global corrective actions, as disclosed below.

Step 502 executes by determining that corrective action 128 is needed to reduce ink use, as disclosed above. The disclosed embodiments may compare baseline average ink use 126 for a set of printing pages 122 to estimated ink use 120 determined for print job 114. If so, then the disclosed embodiments may take a global corrective action. Examples of such global corrective actions are disclosed below with regards to steps 504, 506, and 508. It should be noted that one of these steps may be executed when taking corrective action 128. Alternatively, two or more steps may be executed.

Step 504 executes by adjusting calibration end point targets (EPTs). The disclosed embodiments may automatically adjust the calibration EPTs to lower the maximum ink use for each colorant in print job 114. The colorants may be cyan, magenta, yellow, and black. The EPTs for these inks may be adjusted to lower the maximum ink use for these color inks. For example, the disclosed embodiments may adjust the EPTs from 95% to 93%. EPTs may be stored at DFE 106 so that these values can be changed at printing device 104.

Step 506 executes by adjusting the total area coverage for the combined ink use for print job 114. The disclosed embodiments, alternatively, may adjust the total area coverage to cap the maximum combined ink use for the colorants, or CMYK. For example, the disclosed embodiments may adjust the combined ink limit from 320% to 300%. The combined percentages of the ink use for the colorants should not exceed the new total area coverage. This feature, in turn, reduces ink use for print job 114.

Step 508 executes by adjusting the gray component replacement for print job 114. The disclosed embodiments may adjust gray component replacement so that additional amounts of CMY colorants are replaced with black ink. The grey component for a combination of colors is replaced by black ink, which is usually cheaper than inks for CMY. The number of combinations of colors replacing the gray component with black ink may be increased. This feature, in turn, reduces CMY ink use for print job 114.

Step 510 executes by taking a targeted action by printing system 100 to reduce ink use. This step is disclosed in greater detail below by FIGS. 6A, 6B, and 7.

Step 512 executes by printing a buffer of printed pages 122 after implementing corrective action 128. Step 514 executes by monitoring ink use within the buffer of printed pages 122. Once corrective action 128 is taken, the disclosed embodiments will continue to monitor ink use per page to determine whether ink usage 124 is in a trajectory to fall within acceptable levels as set forth by estimated ink use 120. This determination is not done immediately but based on a buffer of N pages as specified. For example, printing device 104 may print 500 pages as the buffer and then determine baseline average ink use 126 for these pages to determine if the ink use is trending in the right direction.

Step 516 executes by determining that corrective action 128 is not effective in reducing baseline average ink use 126 based on the ink use within the buffer of printed pages 122. If corrective action 128 is effective, then printing system 100 will continue to monitor ink use and adjust up and down as needed to ensure that total ink costs remain within estimated ink use 120 and the estimated costs. Flowchart 500 may return to step 310 disclosed above. Step 516, however, indicates that further action needs to be taken.

Step 518 executes by adjusting ink use by using more aggressive settings than those implemented in steps 504-510. If the ink use is still not on track to be within acceptable levels, then the disclosed embodiments may adjust the ink use actions using more aggressive settings. For example, another corrective action 128 may be implemented to further limit the parameters adjusted in the earlier corrective action. Using this example, the total area coverage adjusted in step 506 may be reduced from 300% to 280%. Alternatively, a different corrective action may be taken from the one implemented earlier. Thus, instead of step 506, step 504 may be executed.

Printing system 100 should be configured so that there is a limit to how aggressive it will be in reducing ink use. These limits may be defined on a system-wide basis or they may be defined on a customer, or even a print job, basis. If the ink use falls below acceptable levels, then the disclosed embodiments may adjust the corrective actions so that ink use is increased to the expected levels. Thus, more than one corrective action may be taken for a print job.

Once the more aggressive settings are implemented, flowchart 500 returns to step 512 to continue monitoring print job 114 for increases or decreases in the baseline average ink use for the buffer of pages. Referring back to step 322, the disclosed embodiments may determine during the monitoring processes that print job 114 is complete or near completion so that no further corrective actions may be taken.

Figure 6A:
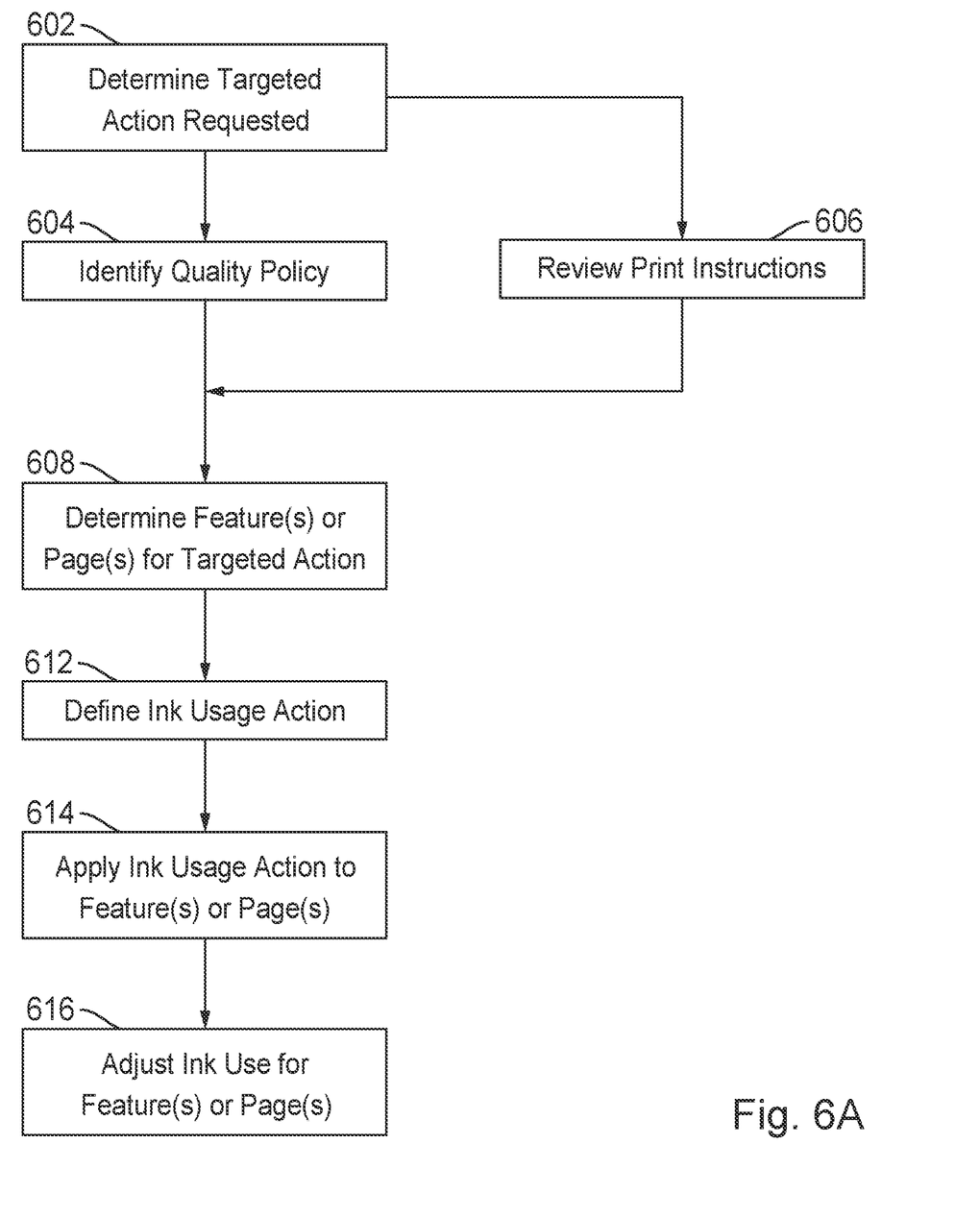
FIG. 6A illustrates a flowchart for implementing a targeted action as the corrective action according to the disclosed embodiments.
Figure 6B:
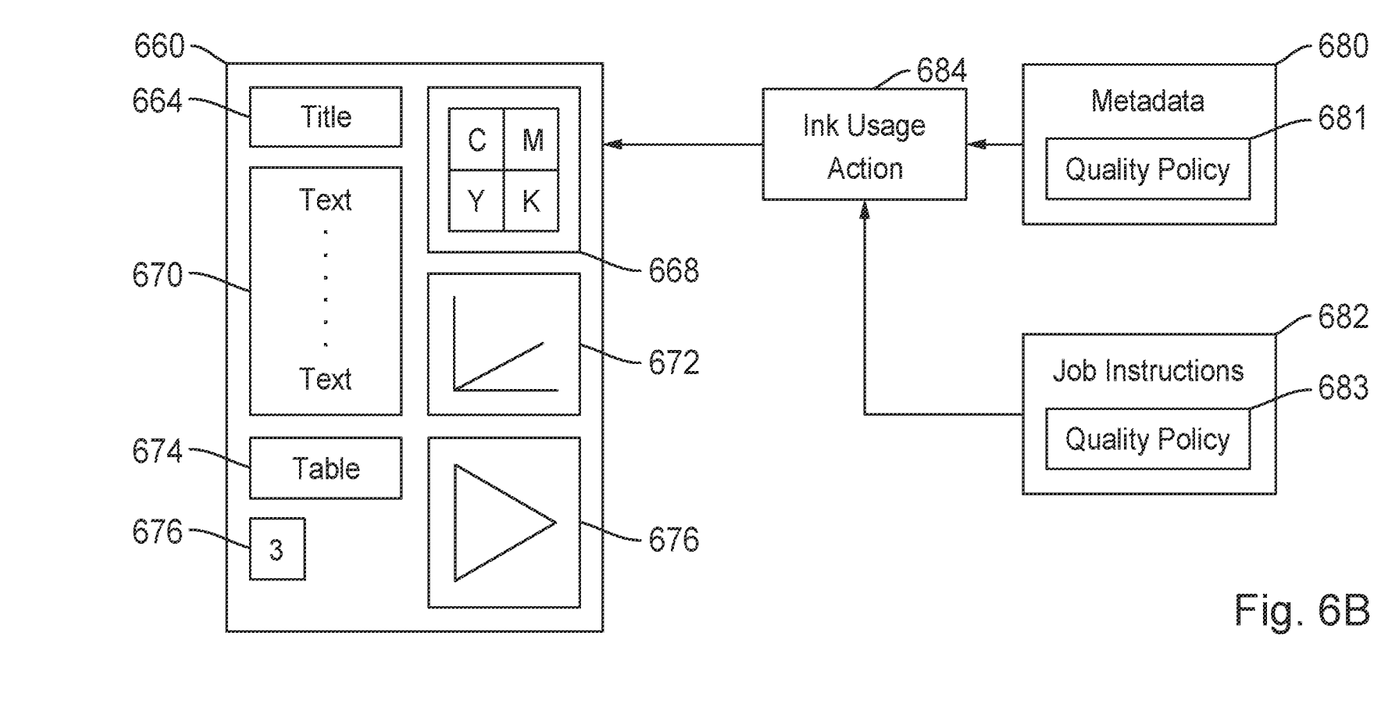
FIG. 6B illustrates an example page subject to the targeted action according to the disclosed embodiments.

FIG. 6A depicts a flowchart 600 for implementing a targeted action as corrective action 128 according to the disclosed embodiments. FIG. 6B depicts an example page 660 subject to the targeted action according to the disclosed embodiments. Flowchart 600 may refer to FIGS. 1A-5 for illustrative purposes. Flowchart 600, however, is not limited by the features disclosed by FIGS. 1A-5. To reduce ink use, the disclosed embodiments may take more targeted actions. Printing system 100 may adjust color image ink limits but leave solid ink limits alone. This feature would make images look less vibrant but would ensure that company logos or other important solid color images remained at full density. Similarly, the disclosed embodiments may reduce the black toner EPT for text but otherwise leave the image and logo EPTs alone.

Targeted actions also may differentiate between photographs or images versus charts when selecting objects for adjustments. Charts may not be adjusted while the images can be or vice versa. Other criteria may be implemented. For example, only images that are above or below a certain size may be adjusted. Thus, an image taking up a whole page within the document may be adjusted while a smaller image is not. Alternatively, the disclosed embodiments may target specific pages within the document. For example, the first two pages may not have their ink limits adjusted while the remaining pages are limited. Further, the disclosed embodiment may target any page in the document, such as pages wholly comprised of text versus any images or logos.

Further, targeted actions may be based on user or customer preference. In other words, specific instructions may be implemented to address the reduction of ink use according to this preference. For example, the customer may determine that ink adjustments may be done on all but the first two pages of the document being printed with print job 114. Using the example above, the document may be 50 pages with 200 copies being print job 114. The customer may specify print quality policies for different pages of the document so that, for example, the first two pages are never adjusted. The main portion of the document is adjusted to a certain extent, while the last two pages may be adjusted more aggressively. The last two pages may be an index or bibliography that is not as important to the overall appearance of the document as the first two pages.

The quality policies for specific pages may be included in the metadata for the pages, which would typically be the case for content that is managed in a content management system or a digital asset management. Alternatively, the quality policies may be specified in the print instructions for the document and part of print job 114.

Thus, step 602 executes by determining a targeted action is requested to be implemented for corrective action 128. The specification for a targeted action may be set in printing system 100 or requested by the operator or customer. Alternatively, a targeted action may be implemented before or after the corrective actions disclosed in FIG. 5.

A targeted action may be implemented using instructions used within printing system 100 for print job 114. It also may be implemented using a quality policy associated with print job 114. Referring to FIG. 6B, a quality policy 681 may be included in metadata 680 for page 660 or print job 114. For example, color management server 108 may refer to quality policy 681 within metadata 680 when corrective action 128 is to be taken. Alternatively, the disclosed embodiments may apply a quality policy 683 within job instructions 682 for print job 114. Job instructions 682 are not necessarily part of the document or page 660 but submitted with print job 114 when provided to printing system 100.

Thus, flowchart 600 may proceed to step 604 if there is a quality policy to apply. Step 604 executes by identifying the quality policy to be applied to reduce ink use for print job 114. As disclosed above, the quality policy may be in metadata 680 for page 660 or print job 114. Alternatively, the quality policy may be in job instructions 682 provided with print job 114. If there is no quality policy, then flowchart 600 proceeds to step 606 to review print instructions provided with print job 114 that may specify any targeted actions to be taken as corrective action 128.

Step 606 executes by determining the features or the pages, or a combination thereof associated with the targeted action. As disclosed above, the targeted action may not be global in nature but directed to specific features or pages within print job 114. Referring to FIG. 6B, these features may be highlighted. Page number 662 identifies the applicable page within the document. As disclosed above, a targeted action may be directed to specific pages within the document, such as the first two pages or last two pages. Thus, page number 662 may be identified by quality policy 681 or 683.

Other features of page 660 include a title 664 for the page. The targeted action may be directed to pages having certain titles, such as an appendix, a chapter, and the like. These pages may be subject to a more aggressive ink use reduction action than other pages. For a chapter page, no ink use reduction may be taken due to customer preference. Page 660 also includes image 668. Image 668 may be comprised of inks for cyan (C), magenta (M), yellow (Y), and black (K). The colorant inks are used to form image 668. As disclosed above, the targeted action may implement adjustments in inks C, M, Y, and K to reduce ink use. Further, more ink K may be used as a gray component replacement if specified by the targeted action.

Page 660 also includes text 670, which may only use black ink, or ink K. The targeted action may implement adjustments to ink use only for text. For example, quality policy 681 or 683 may reduce the EPTs for the ink used for text 670 but otherwise leave the other EPTs alone. Page 660 also includes chart or graph 672 that may use color inks to distinguish items within the graph. Page 660 also may include table 674 which differs from graph 672 in that it lists items or uses only one color or ink. Page 660 also includes logo 676, which also may be comprised of a solid ink, such as black. Logo 676 may differ from image 668, which uses multiple inks to create the image.

Step 612 executes by defining an ink usage action 684 to be taken by the targeted action on page 660. Ink usage action 684 may be specified by quality policy 681 or 683. Examples of ink usage actions may include adjusting ink limits for image 668 but leaving logo 676 alone. Logo 676 is kept at full density while image 668 is less vibrant. It also reduces the potential use of inks C, M, and Y, which are more expensive that black ink K. Another ink usage action may be the reduction of black toner, or ink K, EPTs for text 670 and possibly table 674 but otherwise leave image 668, logo 676, and graph 672 alone.

Other ink usage actions may include targeting images above or below a certain size. Thus, if image 668 is larger than half of page 660, then it may be subject to ink use reduction for inks C, M, Y, and K. Further, if image 668 is a photograph, then it may be treated differently than graph 672 which is not.

Step 614 executes by applying ink usage action 684 to the identified features or pages of print job 114. Ink usage action 684 should adjust the ink use for print job 114 in some manner related to the specified targeted action. Step 616 executes by adjusting ink use for the features or pages subject to ink usage action 684.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for adjusting ink use during a print job, the method comprising:
   providing an estimated ink use for the print job, wherein the estimated ink use is based on an average per page ink usage for the print job;
   printing a first set of pages for the print job;
   establishing a baseline average ink use for the first set of pages;
   comparing the baseline average ink use to the estimated ink use; and
   implementing a corrective action to reduce ink usage for a second set of pages to be printed for the print job based on the comparison, or
   taking no corrective action for the second set of pages to be printed for the print job based on the comparison.

2. The method of claim 1, wherein implementing the corrective action includes analyzing ink usage over a subset of the first set of pages.

3. The method of claim 2, further comprising determining whether the correction action is implemented based on the analyzed ink usage.

4. The method of claim 1, further comprising calculating ink usage for each page of the first set of pages as it is printed.

5. The method of claim 1, wherein implementing the corrective action includes adjusting calibration end point targets for the print job.

6. The method of claim 5, wherein adjusting the calibration end point targets includes lowering a maximum ink use for each colorant in the print job.

7. The method of claim 1, wherein implementing the corrective action includes adjusting the total area coverage of an ink limit for a maximum combined ink use for the print job.

8. The method of claim 7, wherein the adjusting the total area coverage of the ink limit includes adjusting the ink limit for at least one image within the print job.

9. The method of claim 1, wherein implementing the corrective action includes adjusting a gray component replacement factor for the print job.

10. The method of claim 1, wherein implementing the corrective action includes implementing a targeted action to reduce ink usage for the second set of pages.

* * * * *